United States Patent
Gagnon et al.

(10) Patent No.: US 7,065,103 B1
(45) Date of Patent: Jun. 20, 2006

(54) HYPER-CONCATENATION ACROSS MULTIPLE PARALLEL CHANNELS

(75) Inventors: Ronald J. Gagnon, Nepean (CA); Kim B. Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/552,593

(22) Filed: Apr. 19, 2000

(51) Int. Cl.
*H04J 3/24* (2006.01)
*H04J 3/06* (2006.01)
*H04Q 11/04* (2006.01)

(52) U.S. Cl. ............... 370/474; 370/381; 370/419; 370/503

(58) Field of Classification Search ............ 359/124, 359/136; 370/297, 359, 360, 362, 363, 381–383, 370/474, 500, 520, 537–541
See application file for complete search history.

(56) References Cited

U.S. PATENT DOCUMENTS

| | | | | |
|---|---|---|---|---|
| 5,257,261 A | * | 10/1993 | Parruck et al. | ............ 370/522 |
| 5,331,641 A | * | 7/1994 | Parruck et al. | ............ 370/506 |
| 5,710,650 A | | 1/1998 | Dugan | ............ 359/133 |
| 6,002,692 A | | 12/1999 | Wills | ............ 370/465 |
| 6,094,440 A | * | 7/2000 | Sugawara et al. | ............ 370/465 |
| 6,118,795 A | * | 9/2000 | Fukunaga et al. | ............ 370/503 |
| 6,160,819 A | * | 12/2000 | Partridge et al. | ............ 370/474 |

\* cited by examiner

*Primary Examiner*—Huy D. Vu
*Assistant Examiner*—Justin M. Philpott
(74) *Attorney, Agent, or Firm*—Kent Daniels; Ogilvy Renault LLP

(57) ABSTRACT

A signal processor is adapted for aligning two or more hyper-concatenated data streams, each data stream being conveyed within a respective parallel channel and having substantially equivalent bit and frame rates. The signal processor comprises a respective channel processor for each channel for processing a respective data stream. Each channel processor includes a framer, a memory, an interface, and an output timer. The framer generates a local strobe signal indicative of a timing of incoming frames of the respective data stream. The memory buffers incoming bits of the respective data stream. The interface selectively sends the local strobe signal to, and receives a master strobe signal from, an adjacent channel processor. The output timer controls a timing of outgoing bits of the respective data stream based on a selected one of the local and master strobe signals.

51 Claims, 7 Drawing Sheets

HYPER-CONCATENATION ACROSS MULTIPLE PARALLEL CHANNELS

CROSS-REFERENCE TO RELATED APPLICATIONS

This application is related to co-pending and co-assigned U.S. patent application Ser. No. 09/539,707 filed on March 31, 2000, and entitled METHOD AND SYSTEM FOR ESTABLISHING CONTENT-FLEXIBLE CONNECTIONS, the contents of which are hereby incorporated herein be reference.

MICROFICHE APPENDIX

Not Applicable.

TECHNICAL FIELD

The present invention relates to optical communications networks, and in particular to a method for transporting a high-bandwidth, arbitrarily concatenated signal through an end-to-end hyper-concatenated connection incorporating multiple parallel channels.

BACKGROUND OF THE INVENTION

Co-pending and co-assigned U.S. patent application Ser. No. 09/539,707 filed on March 31, 2000, and entitled METHOD AND SYSTEM FOR ESTABLISHING CONTENT-FLEXIBLE CONNECTIONS teaches a technique for establishing an open connection (OP-N), mapped across a communications network. The OP-N connection is "concatenatable", in that an end user can transport arbitrarily concatenated signal traffic through the OP-N connection. In principle, virtually any combination of concatenated and non-concatenated signals may be used, up to the bandwidth capacity of the OP-N connection. The traffic mixture (i.e., the mix of concatenated and non-concatenated traffic) within the OP-N connection can be selected by the end user to satisfy their requirements, and may be changed by the end user as those requirements change, without requiring re-configuration of the OP-N connection. For example, with an OP-6O connection (i.e. N=60, and the OP-60 therefore has a bandwidth capacity equivalent to an Optical Carrier OC-60 signal) an end user could select a traffic mix of: five STS-12c connections on one day, one OC-48c and 12 (unconcatenated) STS-1 connections on another day, and two STS-24 and two STM-4 connections at some other time. Other traffic combinations are also possible, all at the discretion of the end user, and without intervention from a service provider.

It is expected that, in the future, it may be desirable that the bandwidth capacity of an OP-N connection be greater than that permitted by the bit-rate of a signal carried by any one channel (e.g. a wavelength in a Wave Division Multiplexed—WDM, or Dense Wave Division Multiplexed—DWDM network). For example, it may be desirable to set up an OP-768 connection, which would require a line rate of 39.813 GHz to be carried on a single channel, or higher. Thus an OP-N connection may be defined which incorporates an arbitrary number of channels, each of which carries a lower-rate signal (e.g. an OC-48 at 2.488 GHz, or an OC-192 at 9.953 GHz) through respective different wavelengths multiplexed within a single waveguide (e.g. optical fiber) and/or distributed over two or more waveguides. This arrangement permits signals that require too much bandwidth to be transported within a single channel to be split,
or inverse-multiplexed, into multiple data streams that may then be transported through respective channels. However, in order to maintain arbitrary concatenatability within such a multi-channel OP-N connection, it is necessary to maintain precise alignment and/or sequencing of the data streams within their respective channels, so that the high-bandwidth signal can be reassembled at a destination node.

Inverse multiplexing, in which a higher rate signal is distributed among several lower rate signals and then recombined at a destination node, is known in the art. For example, U.S. Pat. No. 6,002,692 (Wills) teaches a system in which a higher rate Synchronous Optical Network (SONET) signal (e.g. an OC-48c at a 2.488 GHz line rate) is inverse multiplexed into multiple Asynchronous Transfer Mode (ATM) cells that are then transported across a switch fabric through respective ports at a lower rate (e.g. 622 MHz). In cases where data of a single SONET frame is carried within two or more ATM cells, each of the cells is provided with a respective sequence number so that the cells can be placed into the correct sequence for reassembling the original SONET frame.

The system of Wills is typical of packet-based inverse-multiplexing methods, in that it requires a significant amount of processing to separate the SONET frame into ATM cell payload; formulate ATM cell headers with assigned sequencing numbers; and then re-sequence the ATM cells prior to reassembly of the SONET frame. Such systems are not easily implemented at multiple gigabits per second line rates. Furthermore, such packet-based methods are not relevant to concatenation of SONET signals, where the lower-rate signals are themselves also SONET signals.

U.S. Pat. No. 5,710,650 (Dugan) teaches a system in which a high data rate OC-192 signal (at a 9.953 GHz line rate) is inverse multiplexed into four lower rate OC-48 signals (at 2.488 GHz line rate) which are transported through respective parallel channels (wavelengths). The lower line rate within each channel provides increased dispersion tolerance, so that longer fiber spans can be used without regeneration of the signals. Misalignment between the OC-48 signals (due to the differing propagation speeds of the four wavelengths) is resolved by processing each of the OC-48 signals in parallel to extract their respective 48 STS-1 signals (each having a 51.840 MHz line rate). These STS-1 signals are then buffered and processed to eliminate any misalignment. Treating the signals in this way dramatically reduces the amount of misalignment which needs to be eliminated (in terms of the number of bits) and so reduces the required length of each realignment buffer. However, the parallel circuits required for independently processing each of the STS-1 signals at the low 51.840 MHz line rate greatly increases the cost of the processing circuitry, and imposes severe restrictions on the available concatenation schemes.

Accordingly, a method and apparatus for aligning data streams, independently of any concatenation scheme, and that is readily extendible across an arbitrary number of channels, remains highly desirable.

SUMMARY OF THE INVENTION

An object of the present invention is to provide a method and system for aligning two or more hyper-concatenated data streams within respective parallel channels.

Another object of the present invention is to provide a method and system for aligning an arbitrary number of hyper-concatenated data streams within respective parallel channels of a multi-channel connection carrying an arbitrary traffic mixture.

An aspect of the present invention provides a channel processor adapted for aligning a respective first hyper-concatenated data stream with a second hyper-concatenated data stream, each hyper-concatenated data stream being conveyed within a respective adjacent parallel channel. The signal processor comprises, in respect of each channel: a framer; a memory; an interface; and an output timer. The framer is adapted to generate a local strobe signal indicative of a timing of incoming frames of the respective data stream. The memory buffers incoming bits of the respective data stream. The interface is adapted to receive a master strobe signal from a selected adjacent channel processor. Finally, the output timer is adapted to control a timing of outgoing bits of the respective data stream based on a selected one of the local and master strobe signals.

A further aspect of the present invention provides a system for processing a plurality of data streams, each data stream being conveyed within a respective parallel channel of a communications network and at least two of the data streams being hyper-concatenated data streams. The system comprises a plurality of channel processors. Each channel processor includes: a framer; a memory; an interface; and an output timer. The framer is adapted to generate a local strobe signal indicative of a timing of incoming frames of a respective data stream. The memory buffers incoming data bits of the respective data stream. The interface is adapted to receive a master strobe signal from a selected adjacent channel processor. The output timer is adapted to control a timing of outgoing bits of the respective data stream, based on a selected one of the local and master strobe signals.

A further aspect of the present invention provides a method of processing two or more hyper-concatenated data streams, each hyper-concatenated data stream being conveyed within respective adjacent parallel channels of a communications network. The method comprises the steps of: designating a one of the hyper-concatenated data streams as a master data stream; designating all others of the hyper-concatenated data streams as slaves to the master; at a channel processor for the master data stream, generating a master strobe signal; propagating the master strobe signal to respective channel processors of each one of the slave data streams; and at the respective channel processor for each slave data stream, adjusting a respective read pointer for outgoing bits of the respective slave data stream, using a local strobe signal and the master strobe signal.

A still further aspect of the present invention provides a method of transporting a high-bandwidth signal comprising M hyper-concatenated data streams across a network between a source node and a destination node. The method comprises the steps of: providing an end-to-end path between the source node and the destination node, the end-to-end path comprising at least M parallel channels; launching each hyper-concatenated data stream from the source node toward the destination node through a respective one of the parallel channels; aligning each of the hyper-concatenated data streams at a downstream end of each hop toward the destination node; and reassembling the high-bandwidth signal at the destination node.

In embodiments of the invention, a control unit is adapted to control a first channel processor to operate in a free-running mode in which the timing of outgoing bits of a respective first hyper-concatenated data stream is based on the local strobe signal; and to control a second channel processor to operate in a slave mode in which the timing of outgoing bits of a respective second hyper-concatenated data stream is synchronized to that of the first hyper-concatenated data stream based on a master strobe signal originating from the first channel processor.

In embodiments of the invention, each channel processor is further adapted to selectively propagate a strobe signal received from one adjacent channel processor to an opposite adjacent channel processor. Preferably, the control unit is further adapted to control a set of two or more adjacent slave channel processors to successively propagate a strobe signal originating from the master channel processor to each one of the slave channel processors, whereby the timing of outgoing bits of each respective slave data stream is synchronized with that of the master data stream.

In embodiments of the invention, each of the hyper-concatenated data streams comprise concatenated Synchronous Optical Network (SONET) signals. The parallel channels may comprise any one or more of: a wavelength of a Wave Division Multiplex (WDM) or a Dense Wave Division Multiplex (DWDM) optical communications system; and a communications channel of a wireless communications system.

In embodiments of the invention, the framer comprises a detector circuit and a strobe circuit. The detector circuit is adapted to generate a detection signal indicative of detection of a first bit of each incoming frame of the respective data stream. The strobe circuit is adapted to generate the local strobe signal with a predetermined timing relative to the detection signal. The detector circuit may be adapted to detect one or more of A1 and A2 bytes of incoming SONET frames. In this case, the framer preferably generates the detection signal with a predetermined timing relative to a first bit of the A1 byte.

The memory may be a First-In-First-Out (FIFO) buffer having a read pointer indicative of an address of a successive outgoing bit of the respective data stream. A storage capacity of the memory can be selected on a basis of a maximum anticipated misalignment between hyper-concatenated data streams received by the system. The storage capacity of the memory is preferably equivalent to approximately one-half of a frame, or less. Still more preferably, the storage capacity of the memory is equivalent to a number of bits received during a time interval of approximately 250 nano-seconds (nSec) or less.

In embodiments of the invention, the output timer comprises a phase error detector and a pointer adjustment circuit. The phase error detector is adapted to detect a phase error between the local strobe signal and the master strobe signal. The pointer adjustment circuit is adapted to adjust the read pointer based on the detected phase error. The phase error detector may comprise a counter adapted to count a number of clock pulses between the local strobe signal and reception of the master strobe signal. The output timer may also include an offset circuit adapted to apply a predetermined offset to the read pointer. The predetermined second offset may be selected to compensate a propagation delay of the master strobe signal.

In an alternative embodiment of the invention, the output timer comprises a software-controlled circuit adapted to measure the phase error between the local strobe signal and the master strobe signal, and to calculate an adjusted position of the read pointer based on the measured phase error.

The output timer may further comprise a switch circuit adapted to supply a selected one of the local strobe signal and the master strobe signal to an input of the phase error detector. Thus the phase error detector can be selectively controlled to detect either: a phase error between the local strobe signal and the received strobe signal; or a phase error between the local strobe signal and itself. By this means, the output timer controls the timing of outgoing bits of the respective data stream based on either one of the local strobe signal alone (i.e. in a free-running mode), or based on the master strobe signal (i.e. in a slave mode).

In embodiments of the invention, the interface comprises input and output circuits, and a direction selector circuit. Each input circuit is adapted to receive a master strobe signal from a respective adjacent channel processor. Each output circuit is adapted to send a selected one of the local strobe signal and the master strobe signal to a respective adjacent channel processor. The selector circuit is adapted to couple a selected one of the input circuits to the output timer and each of the output circuits. As a result, the local strobe signal can be sent to an adjacent channel processor as a master strobe signal for that adjacent channel processor. Additionally, a master strobe signal received from a selected adjacent channel processor can be supplied to the output timer circuit and simultaneously propagated to another adjacent channel processor.

For the purposes of the present invention, the terms "hyper-concatenation" (used as a noun) and "hyper-concatenated connection", shall be understood to refer to a communications path composed of multiple channels that are linked together such that alignment of data streams within each of the member channels is ensured, at least at extreme ends of the communications path. When used a verb, the term "hyper-concatenation" shall be understood to refer to: a process of setting-up a hyper-concatenation (that is, designating member channels of the hyper-concatenated connection, and roles of each member channel); or to a process of inverse-multiplexing data signals for transport through the hyper-concatenated connection. The term "hyper-concatenated data stream" shall be understood to refer to a data stream within a hyper-concatenated connection. Similarly, the term "hyper-concatenated channel" shall refer to a member channel of a hyper-concatenated connection.

Data signals (which may comprise an arbitrary mixture of concatenated and non-concatenated signal traffic) are inverse-multiplexed and transported through the hyper-concatenated connection distributed across multiple hyper-concatenated data streams. At a destination end of the hyper-concatenated connection, the original data signals are recovered from the hyper-concatenated data streams. It will be appreciated that the hyper-concatenated data streams within any one hyper-concatenated connection are sourced from a common point in a communications network, and thus have substantially equivalent data and frame rates. However, hyper-concatenated data streams may well have differing propagation delays and independent timing jitter.

For the purposes of the present invention, the term "parallel channels" shall be understood to refer to channels in which channel ordering is identical at both ends of a connection, and within which respective data streams are not subject to independent pointer processing.

An advantage of the present invention is that a high bandwidth signal, inverse-multiplexed into M hyper-concatenated data streams, can be transported across a network through an end-to-end hyper-concatenated connection comprising M parallel concatenated channels. Each channel carries one of the M hyper-concatenated data streams, and bit-wise alignment of each data stream is maintained at each hop, so that the high bandwidth signal can be readily reassembled at a destination node.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
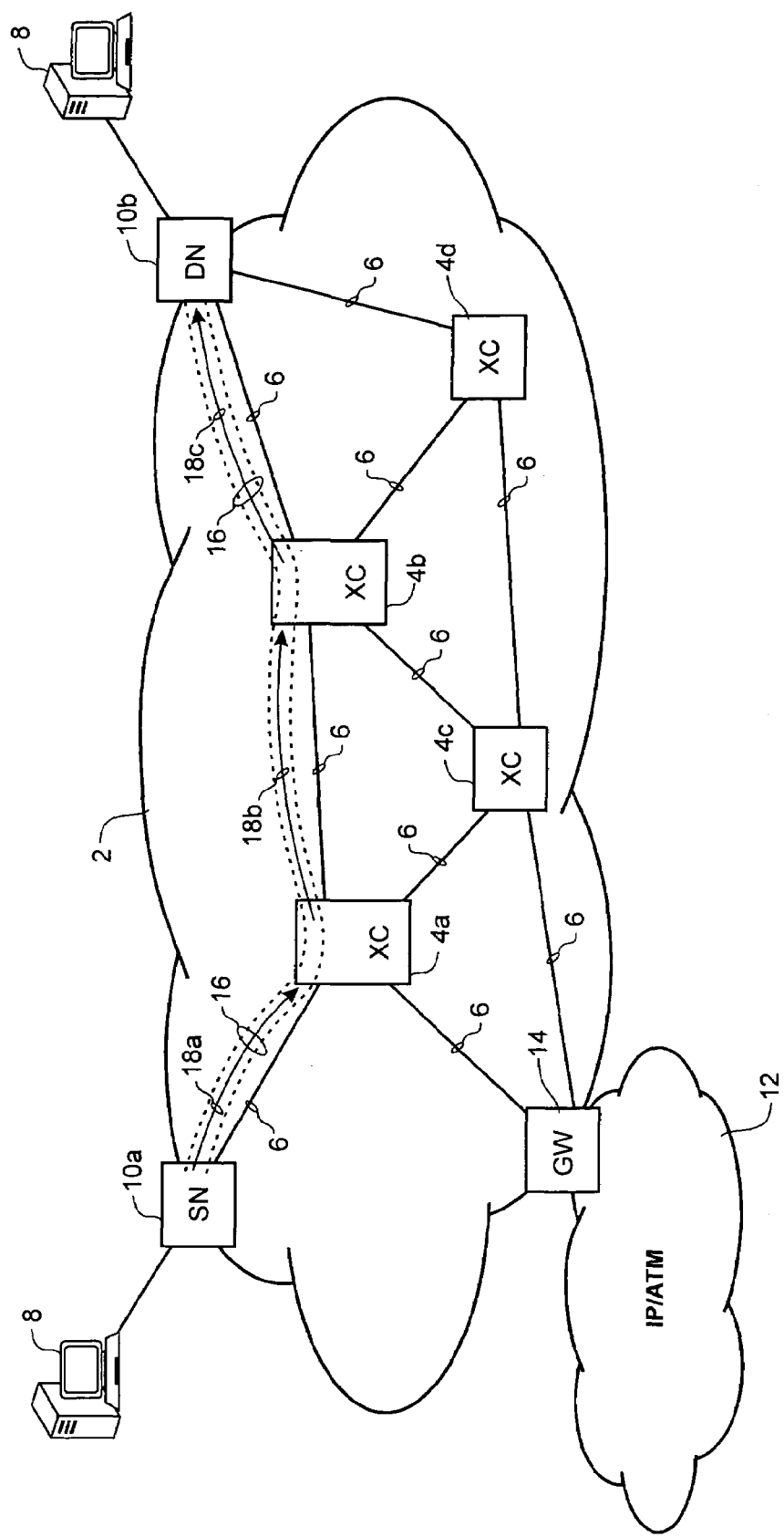
FIG. 1. is a schematic diagram illustrating an optical communications network in which embodiments of the present invention may be deployed.

As shown in FIG. 1, an optical network 2 in which embodiments of the present invention may be deployed generally comprises a plurality of cross-connects 4 (four are shown in FIG. 1) interconnected by fiber optic links 6. Communications devices 8, for example end user personal computers (PCs) or local area network (LAN) servers may be connected to the optical network 2 via one or more edge nodes (or access points) 10. The optical network 2 may also be connected to one or more associated networks 12, for example an asynchronous transfer mode (ATM) or an internet protocol (IP) network, through a respective gateway 14. Within the optical network 2, each of the cross-connects 4 is configured for wave division multiplex (WDM) and/or dense wave division multiplex (DWDM) transport of packet data traffic as will be described in greater detail below.

The present invention enables transport of high-bandwidth, arbitrarily concatenated signals through an end-to-end M-channel (where M is an integer) OPen (OP-N) connection 16 mapped across the communications network 2 between a source node 10a and a destination node 10b via one or more intervening cross-connects 4. The OP-N connection 16 has a bandwidth capacity equivalent to N STS-1 signals. Within that capacity, arbitrary signal concatenation is supported. The OP-N connection 16 is divided into hops 18, each of which is supported by a respective node (e.g. the source node 10a connected at the up-stream end of the hop 18a). In a WDM (or DWDM) network, each channel is a wavelength used for conveying data traffic between nodes. Within each hop, all of the channels may be multiplexed together and launched through a single optical fiber 6, or distributed over two or more parallel fibers. Within each node, the channels are de-multiplexed, processed, and then routed to a downstream hop on a per/channel basis. The wavelength used to convey each channel may be the same or different for each successive hop 18 of the OP-N connection 16. In the example illustrated in FIGS. 1 and 2, the source and destination nodes 10a and 10b are located at respective edge nodes, and two intervening cross-connects 4a and 4b are incorporated into the OP-N connection 16.

Figure 2:
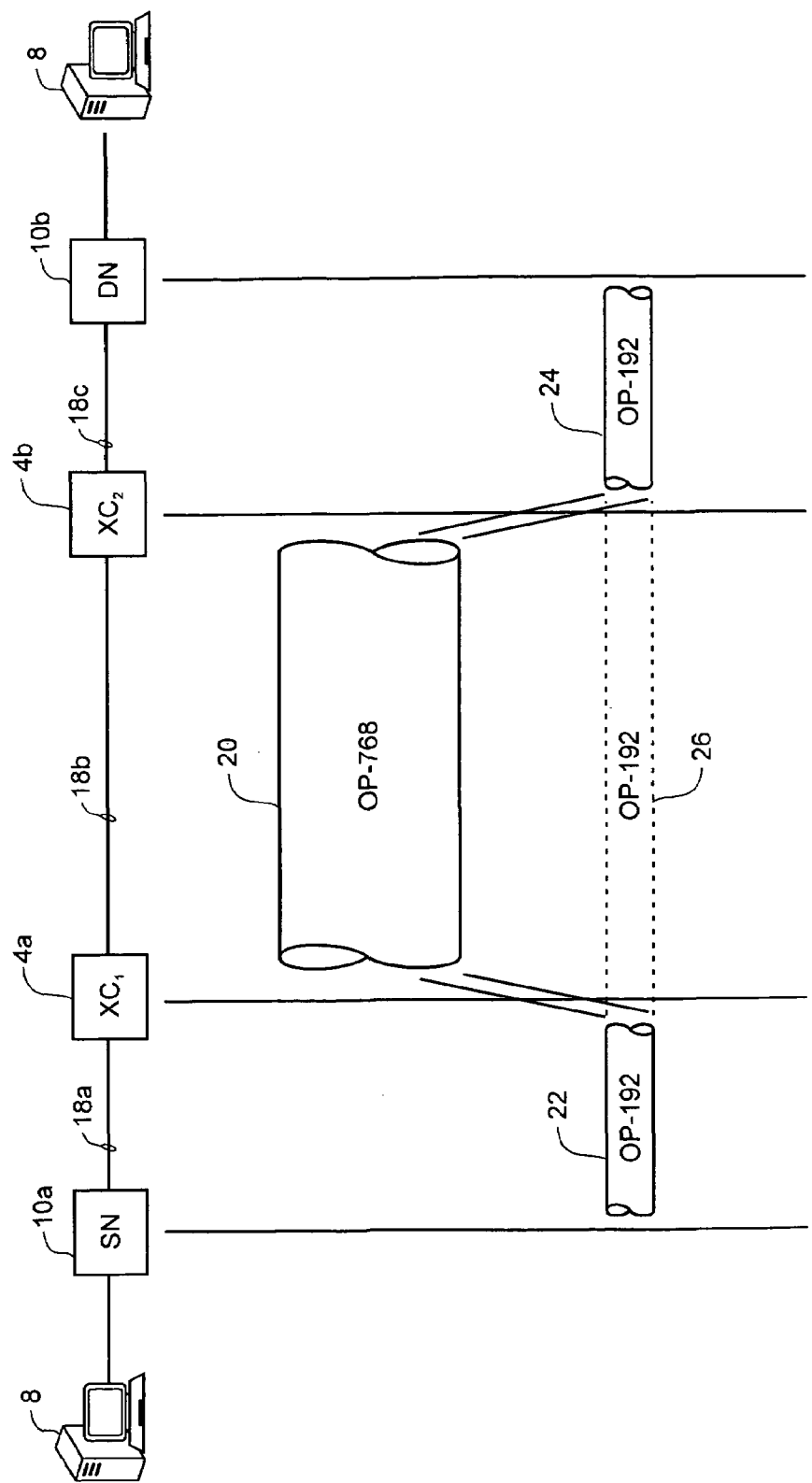
FIG. 2 is a schematic diagram illustrating the set-up of the end-to-end OP-N connection illustrated in FIG. 1.

FIG. 2 is a schematic diagram illustrating an exemplary set-up of the OP-N connection 16 mapped between the source and destination nodes 10a and 10b. In the illustrated embodiment, the OP-N connection 16 is an OP-192 connection, thus having a bandwidth equivalent to N=192 STS-1 signals. Within this connection, signal concatenation is not provisioned, so that an arbitrary concatenation scheme (up to the bandwidth capacity of the OP-N) can be defined by an end user. As shown in FIG. 2, the OP-N connection 16 may be constructed using a layered model. For example, the network service provider may elect to set up high bandwidth OP-N core connections between cross-connects 4 within the core of the network. In the illustrated example, these high bandwidth core connections include an OP-768 core connection 20 set up between the first and second cross-connects 4a and 4b. The OP-N connection 16 is set up, for example, by a network service provider in response to a request from an end user for an end-to-end open connection having a bandwidth of N=192. Setting up this end-to-end open connection requires that the network service provider establish feeder OP-192 connections 22 and 24 between the source node and the first cross-connect 4a, and between the second cross-connect 4b and the destination node 10b. These feeder OP-192 connections 22,24 are then linked by a virtual OP-192 connection 26 which is set up by allocating a portion of the bandwidth of the OP-768 core connection 20 previously established between the two cross-connects 4a and 4b.

Throughout the length of the end-to-end OP-N connection 16, a predetermined number of channels (i.e. M, an integer) are utilized. Depending on the traffic mix selected by the end-user, two or more (up to a limit of M) adjacent parallel channels of the OP-N connection 16 can be hyper-concatenated to define a hyper-concatenated connection 27 within the OP-N connection 16. High bandwidth data traffic originating at the end-user's communications device 8 is inverse-multiplexed across the hyper-concatenated channels of the OP-N connection 16, at the source node 10a, and launched as hyper-concatenated data streams through the OP-N connection 16. Each channel carries a respective data stream. Two or more channels may be either multiplexed within a single waveguide (e.g. optical fiber) or distributed over two or more waveguides. At the destination node 10b, the hyper-concatenated data streams are recombined to recover the original end-user's data traffic. This inverse-multiplexing and recovery process is preferably transparent to the end user.

For the purposes of the present invention, the M channels of the OP-N connection 16 are considered to be parallel in the sense that although the channels may follow different paths (e.g. optical fibers), their respective channel ordering is identical at both the source node 10a and the destination node 10b. Additionally, the M data streams are not subject to independent pointer processing at any intermediate nodes between the source node 10a and the destination node 10b.

Figure 3:
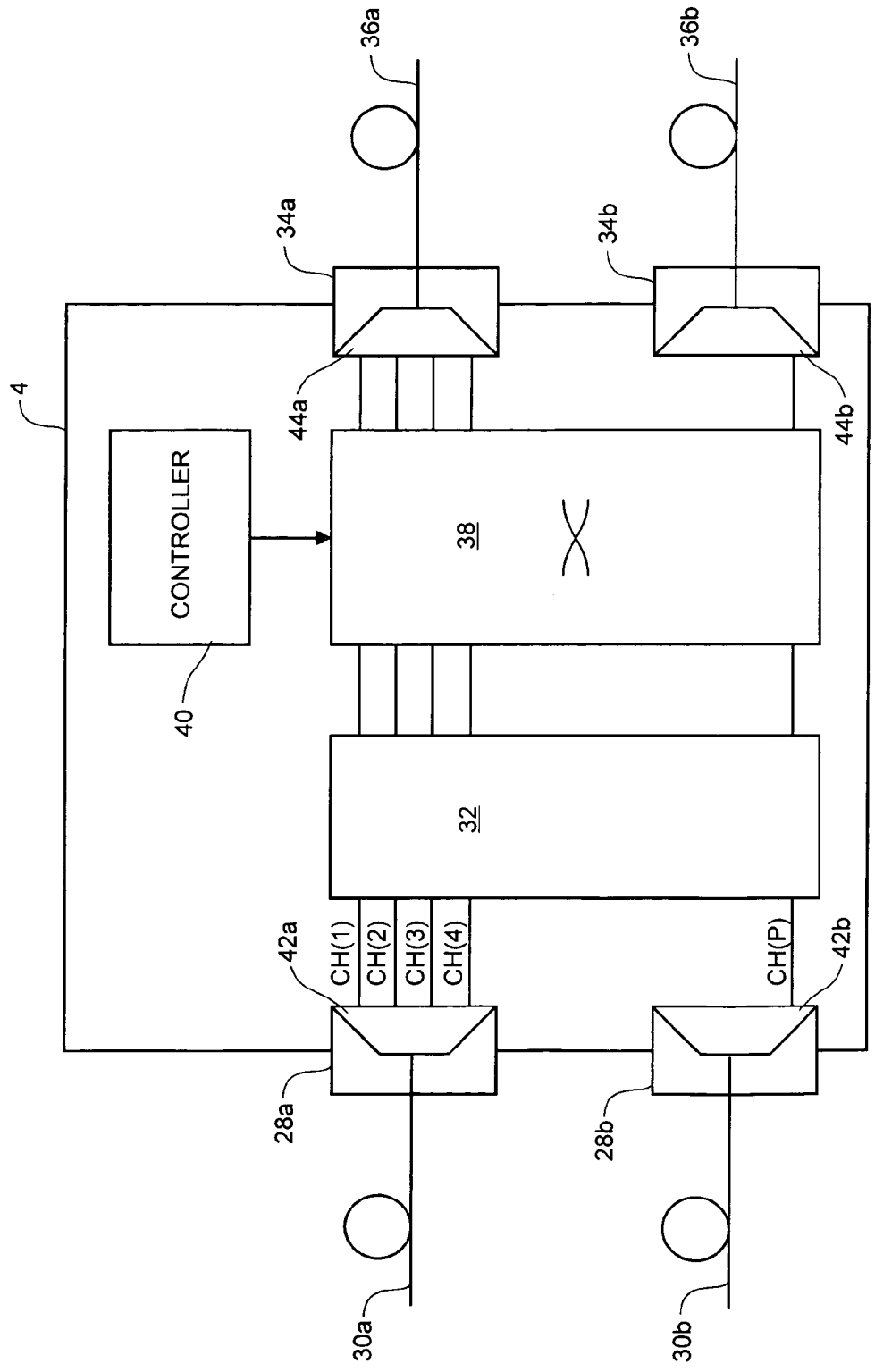
FIG. 3 is a block diagram schematically illustrating a network node in accordance with an embodiment of the present invention.

FIG. 3 is a block diagram schematically illustrating the principal elements of a cross-connect 4 of the optical network. As shown in FIG. 3, the cross-connect 4 includes at least one input port 28 connected to a respective upstream fiber 30; a signal processor 32 for processing respective data streams within each channel; at least one output port 34 connected to a respective downstream fiber 36; a switch 38 capable of providing a signal path for each channel between respective input and output ports 28, 34; and a controller 40 for controlling operation of the cross-connect 4. The controller 40 can be provided with a buffer (not shown) for temporarily storing information, such as, for example, routing information for each OP-N routed through the cross-connect 4.

In the embodiment shown in FIG. 3 the cross-connect 4 has two input ports 28a and 28b and two output ports 34a and 34b. However, it will be appreciated that the cross-connect 4 may be provisioned with a plurality of ports, of which one or more may be unused. It will also be appreciated that the ports of the cross-connect 4 may be configured to handle bi-directional data traffic. However, in order to simplify the present description, and aid understanding of the invention, the embodiment shown in FIG. 3 is provided with unidirectional ports, two of which (input ports 28a and 28b) are configured to handle inbound signal traffic, and the other two (output ports 34a and 34b) are configured to handle outbound signal traffic.

As shown in FIG. 3, each input port 28 includes a demultiplexor 42 for demultiplexing the respective channels of the respective upstream fibers 30a,b. Similarly, each output port 24 includes a multiplexor 44 for multiplexing the channels of a respective downstream fiber.

The signal processor 32 and switch fabric 38 are configured to successively process and route data streams on a per-channel basis through the cross connect 4. The signal processor 32 can be designed to process data streams within an arbitrary number (e.g. P, an integer) of channels, which will normally be equal to or greater than the number M of channels of the OP-N connection 16. Because each OP-N connection mapped through the network is assigned a unique set of M channels, it is possible for the signal processor 32 and switch 38 to simultaneously process and route data streams of two or more OP-N connections routed through the cross-connect 4. It is also possible for the processor 32 and switch fabric 38 to process and route data streams on other channels not assigned to an OP-N connection, in addition to the OP-N traffic. Per-channel routing of data streams through the switch 38 is known in the art, and therefore will not be further described. Per-channel processing of data streams by the signal processor 32 will be described in greater detail below with reference to FIG. 4.

Figure 4:
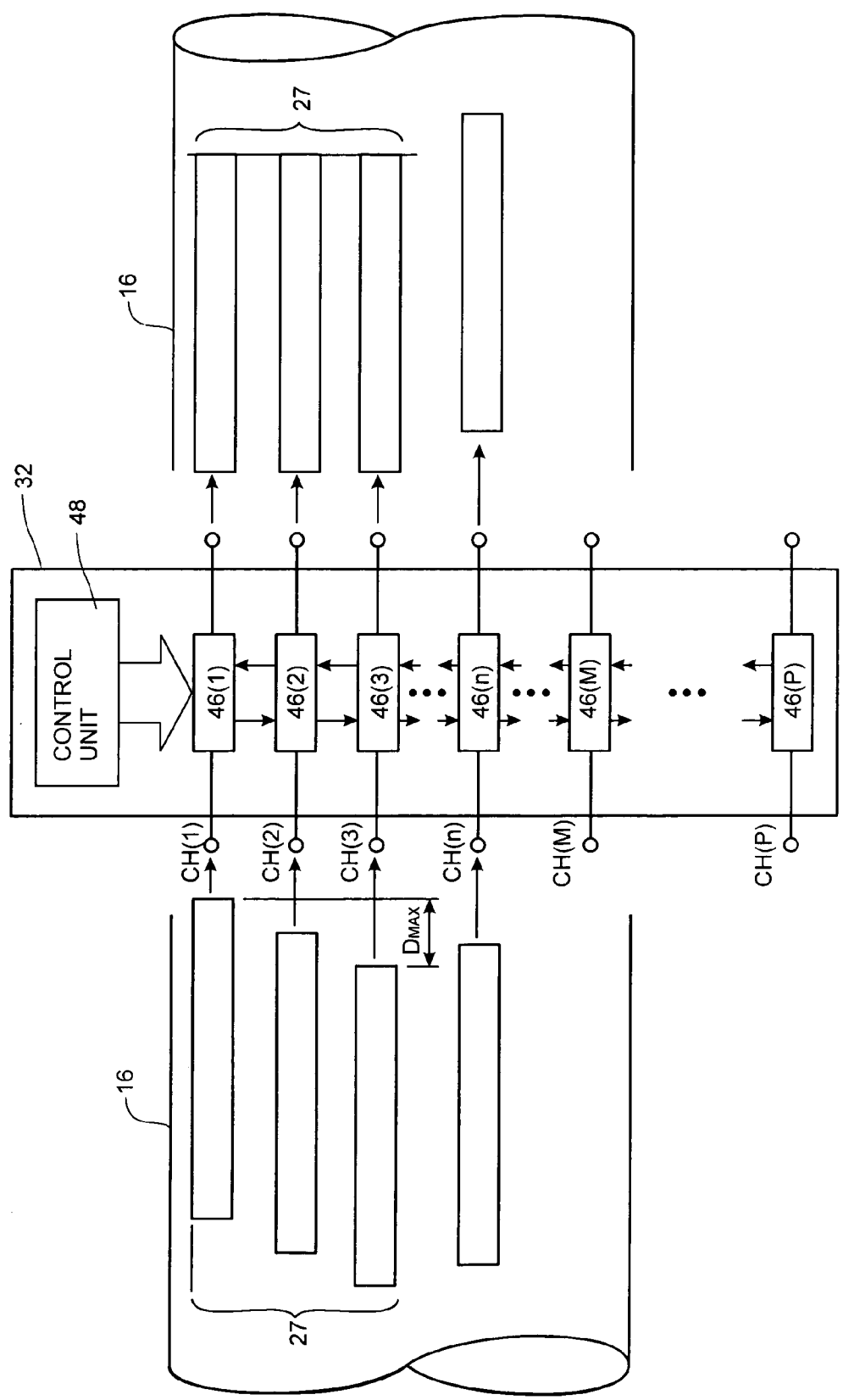
FIG. 4 is a block diagram schematically illustrating principal components and operation of a signal processor in accordance with an embodiment of the present invention.

FIG. 4 is a block diagram schematically illustrating the operation and principal elements of the signal processor 32. In general, the signal processor 32 comprises an array of P channel processors 46, each of which operates to process a data stream within a respective one of P channels. Each of the channel processors 46 is linked (via an interface) in order to exchange strobe signals which can be used to synchronize adjacent data streams, in a manner which will be described in greater detail below. A control unit 48 is provided to control operations of each of the channel processors 46, and thus enable synchronization of data streams. Exemplary operation modes of each channel processor 46 include a free-run mode, and a slave mode. In the free-run mode, bits of a data stream are processed through a channel processor 46 independently of a timing of other data streams. Conversely, in a slave mode, a data stream is processed through the channel processor 46 such that the timing of bits being output from the channel processor 46 is controlled in accordance with a strobe signal received from an adjacent channel processor. Both of these exemplary operation modes will be described in greater detail below with reference to FIGS. 5 and 6a–6b.

In general, the number of channel processors 46 provided in the signal processor 32 will equal the number P of channels handled by the cross-connect 4, and may be several hundred or more. The channel processors 46 may be incorporated in a single application specific integrated circuit (ASIC) or may be distributed across two or more ASICs connected to operate in parallel. The channel processors 46 are enabled to operate independently or cooperatively, as required to handle an arbitrary number of hyper-concatenated data streams distributed over multiple channels. In the embodiment illustrated in FIG. 4, the signal processor 32 includes P channel processors 46(1)–46(p), of which channel processors 46(1)–46(M) are assigned to the OP-N connection 16. Within the OP-N connection 16, a set of three adjacent channels (CH(1)–CH(3)) form a hyper-concatenation 27 carrying a corresponding set of hyper-concatenated data streams that are processed cooperatively by a corresponding set of three channel processors 46(1)–46(3). A fourth (independent) data stream is carried on a respective channel CH(n) and processed by a corresponding channel processor 46(n).

As mentioned above, any combination of hyper-concatenated and independent data streams may be processed in parallel through the signal processor 32. Thus, the OP-N connection 16 could include two or more hyper-concatenated connections 27. Furthermore, a hyper-concatenated connection 27 may, in principle, include up to P hyper-concatenated data streams, utilizing the entire capacity of the signal processor 32. Similarly, it will be appreciated that data streams within multiple OP-N connections may be processed, in parallel, through the signal processor 32. Limitations to this degree of flexibility are as follows:

within any hyper-concatenation 27, each hyper-concatenated data stream must be frequency locked and have the same frame rate (e.g. 8 kilohertz);

all of the hyper-concatenated data streams within a hyper-concatenation 27 must be carried on adjacent parallel channels and must not have had independent pointer processing at any node between the source node and the signal processor 32;

each hyper-concatenated connection 27 must be carried on a unique set of channels. The channels occupied by different hyper-concatenated connections 27 may be adjacent one another or may be separated by one or more channels carrying non-hyper-concatenated data streams.

As will be described in greater detail below, each non-hyper-concatenated data stream is processed by the signal processor 32 by placing the respective channel processor 46 into a "free run" mode so that the data stream is processed independently of other data streams. A set of hyper-concatenated connection 27, on the other hand, is processed by selecting one channel as a master channel. The master channel channel processor 46 operates in the free run mode. This master channel channel processor 46 therefore generates a strobe signal indicative of the timing of the master data stream. The strobe signal is propagated from the master channel processor 46 to each of the other channel processors 46 of the hyper-concatenated connection 27, which are placed in a slave mode dependent on the received strobe signal. As may be seen in FIG. 4, the strobe signal 49 can be propagated, channel by channel in either direction between the channel processors 46. Consequently, any one of the channels occupied by a hyper-concatenated connection 27 may be selected as the master, and the strobe signal propagated as required to the slave channel processors 46 of the hyper-concatenation 27.

In general, contention between data streams of different OP-N connections may be avoided by designating a unique set of channels to each OP-N connection. Similarly, within each OP-N connection, channel groupings to accommodate a desired mix of hyper-concatenated and non-hyper-concatenated data streams can be assigned by the control unit 48 as required in response to request messages received from an edge device, which also permits an end user to alter the traffic mix as required. Normally, within each group of channels allocated to a particular set of hyper-concatenated connection 27, the master channel will be designated by the control unit 48 during set up of the hyper-concatenation. However, the master channel can be changed during a communications session in the event of severely errored frames or loss of frames on the designated master channel.

Exemplary components and operations of each channel processor 46 are described below in greater detail with reference to FIGS. 5 and 6a–6b.

Figure 5:
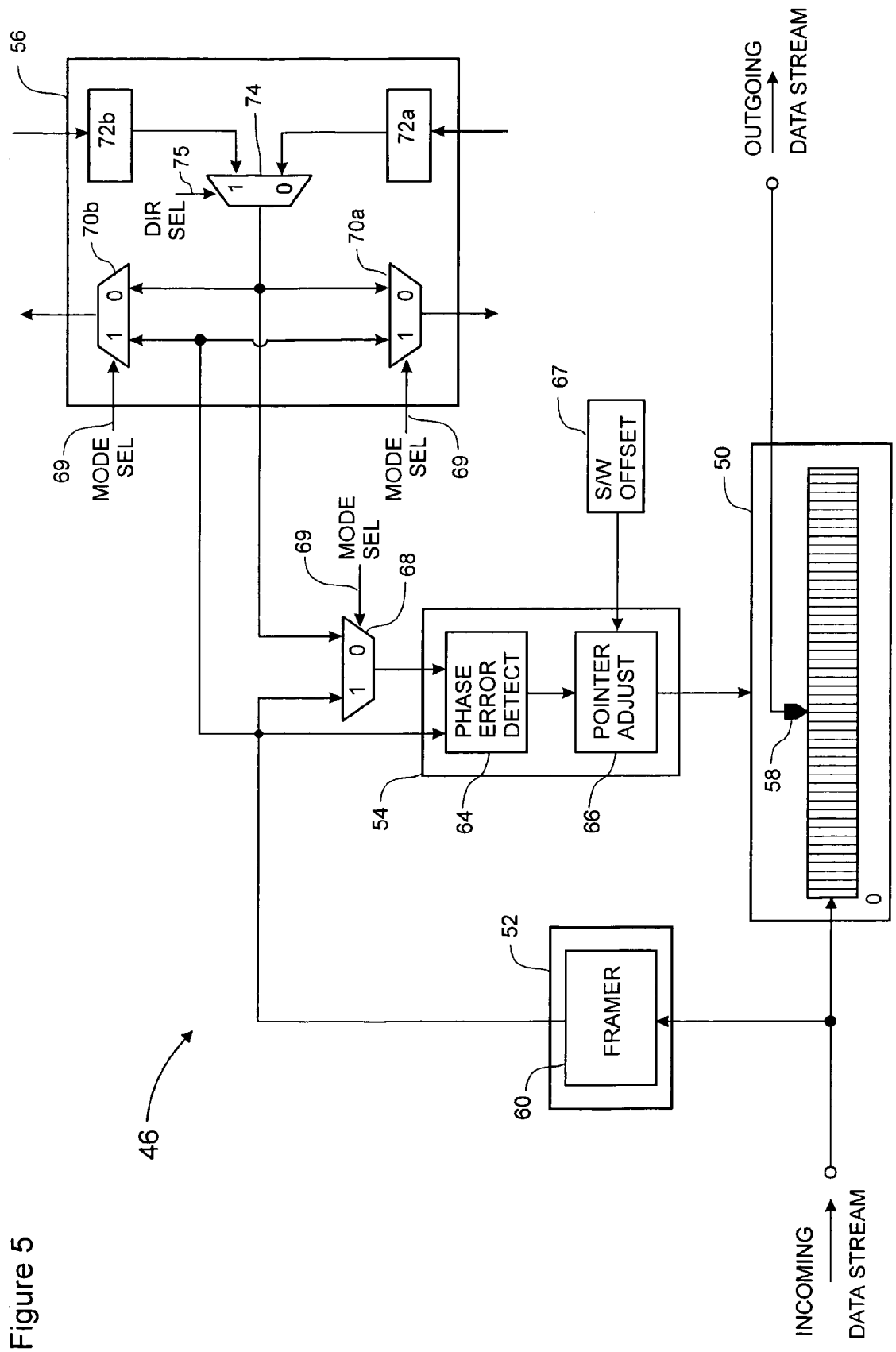
FIG. 5 is a block diagram schematically illustrating principal components of a channel processor in the signal processor illustrated in FIG. 4.

As shown in FIG. 5, a channel processor 46 in accordance with the present invention generally comprises a buffer 50, an input timer 52, and an output timer 54. An interface 56 is also provided to enable the channel processor 46 to send strobe signals to and receive strobe signals from adjacent channel processors 46.

The buffer 50 provides an elastic store for temporarily storing bits of a respective data stream. The buffer 50 is preferably formed as a first-in-first-out (FIFO) queue having an adjustable read pointer 58. The FIFO, which may be implemented as a shift register clocked at a bit rate of the respective data stream, receives successive bits of the data stream at an input address (nominally identified as address zero). Stored bits of the data stream are clocked through the FIFO (from left to right in the illustrations of FIGS. 5, 6a and 6b). When successive bits arrive at the address identified by the read pointer 58, they are read out of the FIFO and transmitted downstream as an outgoing data stream. With this arrangement, the propagation delay of the data stream through the buffer 50 is determined by the bit rate, the length of the buffer 50 (in terms of the number of stored bits), and the position of the read pointer 58 within the buffer 50. Synchronizing hyper-concatenated data streams in concatenation 27 can thus be accomplished by adjusting respective read pointers 58 within each of the buffers 50 so that a first bit of a frame of each of the hyper-concatenated data streams is read from the respective buffer 50 simultaneously, irrespective of when the bits arrived at the respective buffer 50.

In principle, virtually any amount of misalignment between hyper-concatenated data streams can be compensated in this manner. In practice, however, the maximum degree of misalignment between hyper-concatenated data streams is limited by the length of the buffers 50. A longer buffer allows compensation for a greater degree of misalignment. On the other hand, the use of long buffers increases equipment cost and, since the use of buffering within a channel inevitably imposes transmission delays, the use of long buffers in each of a series of nodes in an end-to-end path may result in the accumulation of unacceptable transmission delay. Additionally, in a case where a degree of misalignment is equal to or greater than one half a frame, the frame concatenation sequence becomes ambiguous, as a determination must be made as to whether a frame is leading or lagging corresponding frames in other channels of the concatenation 27. Resolving this ambiguity requires interpretation of the concatenated frames within each hyper-concatenated data stream, which is very difficult to perform at high bit rates. Accordingly, in practice, it is preferable that the length of each buffer 50 is not more than about half of the length of a frame. In terms of transmission delay, a buffer length equivalent to the number of bits received in a period having a duration of approximately 250 nano-seconds (nSec) or less is preferable.

The input timer 52 generates a local strobe signal indicative of a timing of frames of the incoming data stream, as well as a clock signal that is phase and frequency locked with incoming bits of the respective data stream. The input timer 52 preferably includes a framer circuit 60 and a clock recovery circuit (not shown). The framer circuit 60 may include a frame detector (not shown) which operates in a manner known in the art to detect A1 and A2 bytes of each incoming frame, and a strobe circuit (not shown) which generates the local strobe signal frequency locked with a frame rate of the respective data stream, and phase locked with detection of the A1 and A2 bytes of each frame. The local strobe signal is passed to the output timer 54 for use in controlling a position of the read pointer 58 for the respective data stream, and passed to the interfaces 56 for possible transmission to adjacent channel processors 46. The clock recovery circuit (not shown) operates to produce clock signals in a manner well known in the art.

The output timer 54 controls a timing of outgoing bits of the data stream, by adjusting the location of the read pointer 58 within the buffer 50. The details of this operation depend on the operating mode of the channel processor 46. In particular, in the free running mode, the output timer 54 controls the timing of outgoing bits of the respective data stream based principally on the local strobe signal generated by the input timer 52. In slave mode, the output timer 54 operates to control the timing of outgoing bits of the data stream based on both the local strobe signal and a master strobe signal received from an adjacent channel processor 46. Each mode of operation is accommodated by a phase error detection circuit 64 and a read pointer adjuster circuit 66.

The phase error detection circuit 64 receives the local strobe signal as well as a second strobe signal (described below), and detects a phase difference between the two strobe signals. This detected phase error is then used by the read pointer adjustment circuit 66 to apply an offset to the position of the read pointer 58 in order to compensate for the detected phase difference. An additional fixed offset output by an offset register 67 (which may be software provisioned under control of the control unit 48) may also be supplied to the read pointer adjustment circuit 66 to compensate for propagation delays in the various strobe signals, as well as delays incurred in the phase error detect circuit 64 and the read pointer adjustment circuit 66.

In an exemplary embodiment, the phase error detection circuit 64 is implemented as a counter that operates to count clock pulses between reception of the two strobe signals. The pulse count value is then passed to the read pointer adjustment circuit 66 as the detected phase error. The read pointer adjustment circuit 66 uses the detected phase error to adjust the read pointer 58 to an address within the buffer 50 that is offset from a predetermined base address by a number of bits indicated by the pulse count. The optional (software provisioned) offset output by offset register 67 is also used by the read pointer adjustment circuit 66 to apply an additional offset to the read pointer 58. Alternatively, the optional offset can be used to adjust a position of the base address relative to an input address of the buffer 50.

In an alternative embodiment (not shown in the figures), the output timer 54 is implemented by suitable circuitry and software which operates to measure the phase difference between the two strobe signals, and calculate an adjusted position of the read pointer 58 in order to compensate for the measured phase difference. In this embodiment, the optional offset output by the offset register 67 can be omitted, as any additional offsets (e.g. required to compensate for propagation delays) can be incorporated into the software implementation of the output timer 54.

As described above, the phase error detection circuit 64 determines a phase error between the local strobe signal and the second strobe signal. The output timing circuit is operated in the free running mode or the slave mode, as desired, by selecting one of the local strobe signal and the master strobe signal as the second strobe signal. Selection of the second strobe signal is accomplished by supplying both the local strobe signal and the master strobe signal to respective inputs of a switch circuit 68 (e.g. a MUX) which is controlled by a mode select signal 69 asserted by the control unit 48. Thus in the free running mode, the switch circuit 68 supplies the local strobe signal to the phase error detection circuit 64 as the second strobe signal. The phase error detection circuit 64 calculates a phase difference between the two sources of the local strobe signal, which yields a zero phase error. In response to the zero phase error, the read pointer adjustment circuit 66 sets the position of the read pointer 58 to correspond with the predetermined base address, plus any provisioned additional offset. In this condition, the timing of outgoing bits of the respective data streams is controlled primarily in accordance with the local strobe signal. Master strobe signals may be received from adjacent channel processors 46. However, since these master strobe signals are not passed to the phase error detection circuit 68, they do not influence the timing of outgoing bits of the respective data stream.

Conversely, in the slave mode, the switch circuit 68 is controlled by the control unit 48 (FIG. 4) to select a received master strobe signal as the second strobe signal. In this condition, the phase error detection circuit 64 operates to determine a phase difference between the local strobe signal and the master strobe signal, which generally yields a non-zero value. The read pointer adjustment circuit then determines a new location for the read pointer 58 which compensates for the detected phase difference. Consequently, the timing of outgoing bits of the respective data stream is controlled in accordance with the phase difference between the local and master strobe signals, thereby permitting the data stream to be synchronized with the master data stream. Interaction between adjacent channel processors 46 to accomplish this synchronization will be described in further detail below with reference to FIGS. 6a and 6b.

As discussed above and illustrated in FIG. 5, each channel processor also includes an interface 56 that sends and receives strobe signals to and from respective adjacent channel processors 46. The interface 56 includes a pair of output circuits 70 and a pair of input circuits 72.

Each input circuit 72 receives a master strobe signal from a respective adjacent channel processor 46, and passes the respective master strobe signal to a direction selector circuit 74. The direction selector circuit 74 is used to select one of the two master strobe signals, and the selected signal is passed to the switch circuit 68. Preferably, the input circuit 72 also performs signal conditioning on the received master strobe signals. Exemplary conditioning functions include: re-timing the master strobe using a local clock (e.g. supplied by the clock recovery circuit; rising edge detection; and signal validation (e.g. to ensure that the master strobe signal has an appropriate predetermined frequency, such as 8 kHz. This validation process takes into account, and compensates for, re-timing uncertainty that may result from the master strobe signal being asynchronously re-timed based on the locally generated recovered clock signal. A loss of a strobe signal can also be detected, and used to trigger an alarm state to the controller unit 48 (FIG. 4).

In an alternative embodiment, the conditioning functions of the input circuit 72 may be relocated to a point between the direction selector circuit 74 and the switch circuit 68, so that a strobe signal can propagate across multiple channel processors with minimum delay because signal conditioning is not performed in each channel processor 46 prior to re-propagation.

The direction selector circuit 74, e.g. a MUX, is controlled by a direction selection signal 75 asserted by the control unit 48. The direction selector circuit 74 selects one of the received master strobe signals for use by the channel processor 46. The selected master strobe signal, in addition to being passed to the switch circuit 68, is also passed to the output circuit 70 of each interface 56 so that (in accordance with the operating mode of the channel processor 46) the selected master strobe signal or the local strobe signal can be relayed to each of the adjacent channel processors 46.

The output circuit 70 of the interface 56 includes a switch circuit, e.g. a MUX, controlled by the mode select signal 69 asserted by the control unit 48 (FIG. 4). The output circuit 70 receives the selected master strobe signal and the local strobe signal at respective inputs, and, depending on the asserted state of the mode select signal, propagates one of the local strobe signal and the selected master strobe signal to an adjacent channel processor. When the channel processor 46 is in the free run mode, the output circuit 70 of the interface 56 propagates the local strobe signal to both adjacent channel processors. In this mode of operation, the state of the direction selector circuit 74 is not material, because neither of the received master strobe signals are utilized. On the other hand, when the channel processor is in a slave mode, the output circuits 70*a*, 70*b* propagate the master strobe signal selected by the direction selector circuit 74 to both of the adjacent channel processors. In this case, the direction selector circuit 74 is controlled to select the direction from which a master strobe signal is received for synchronization purposes.

The process of synchronizing hyper-concatenated data streams within a hyper-concatenation 27 will now be described, with reference to the signal processor 32 illustrated in FIG. 4. As shown in FIG. 4, the OP-N connection 16 includes a hyper-concatenated connection 7 composed of three hyper-concatenated channels CH(1)–CH(3) carrying respective hyper-concatenated data streams. Each of the hyper-concatenated data streams is processed by respective channel processors 46(1)–46(3). Synchronization of the three hyper-concatenated data streams proceeds as follows. When the hyper-concatenation 27 is set up, one of the hyper-concatenated channels (e.g. CH(1)) is designated as a master channel, and the other hyper-concatenated channels CH(2) and CH(3) are designated as slave channels. The corresponding channel processors 46 are likewise designated as master and slave channel processors. The master channel processor 46(1) is therefore set to free-run mode by the control unit 48. Accordingly, the selector switch 68(1) of the master channel processor 46(1) is set so that the output timer 54(1) operates exclusively on the basis of the local strobe signal, and the output circuits 70*a*,*b* of the interface 56(1) are set to pass the local strobe signal to each adjacent channel processor (in this example, first slave channel processor 46(2)) as the master strobe signal. The state of the direction selector circuit 74(1) of the master channel processor 46(1) is irrelevant.

The slave channel processors 46(2), 46(3) are set to slave mode by the control unit 48. Thus in each slave channel processor 46(2), 46(3), the selector switch 68 is set so that the output timer 54 operates on the basis of the respective local strobe signal and a received master strobe signal. The direction selector circuit 74 is set to select the master strobe signal propagated from the direction of the master channel processor 46(1). Finally, each output circuit 70 of the interface 56 is set to propagate the selected master strobe signal to both adjacent channel processors.

Accordingly, the first slave channel processor 46(2), immediately adjacent the master channel processor 46(1), receives the master strobe signal propagated from the master channel processor 46(1). This master strobe signal is selected by the direction selector circuit 74 and passed to the output timer 54 (2). The master strobe signal is also passed to the output circuits 70*a*,*b* of the interface 56 and thereby passed to both adjacent channel processors 46(1) and 46(3). The master strobe signal passed back to the master channel processor 46(1) is ignored.

The second slave channel processor 46(3) operates in the same way as the first slave channel processor 46(2). The direction selector circuit 74(3) is set to select the master strobe signal propagated from the first slave channel processor 46(2). The selected master strobe signal is passed to the output timer 54 and to the output circuits 70*a*,*b* of the interfaces 56. One of the output circuits 70*b* passes the master strobe signal back to the first slave channel processor 46(2), where it is ignored. The other output circuit 70*a* passes the master strobe signal to the next adjacent channel processor 46(4) (not shown), where, in this example, it is likewise ignored.

In the example described above with reference to FIG. 4, the local strobe signal generated by the free running master channel processor 46(1) is propagated as the selected master strobe signal, to each of the slave channel processors 46(2) and 46(3). In fact, the master strobe signal propagated from the free running master channel processor 46(1) is propagated (in both directions) channel-by-channel through the signal processor 32, until it reaches any of: a channel processor 46 at an edge of the signal processor 32; another free running (master) channel processor 46; or a slave channel processor in which the direction selector circuit 74 is set to select a master strobe signal received from the opposite direction.

Using the construction and operation of the channel processors described 46 with reference to FIGS. 4 and 5, any hyper-concatenated data stream in a hyper-concatenated connection 27 can be designated the master data stream. However, for reasons that will be explained below in more detail, a slowest of the hyper-concatenated data streams is preferably designated as master in order to minimize trans-channel-processor delay.

In the example shown in FIG. 4, the master channel CH(1) is at the edge of the signal processor 32, and has the fastest propagation speed (of the hyper-concatenated channels). However, any one of channels CH(1), CH(2), or CH(3) could have been selected as the master, without affecting the synchronization operation.

Figure 6A:
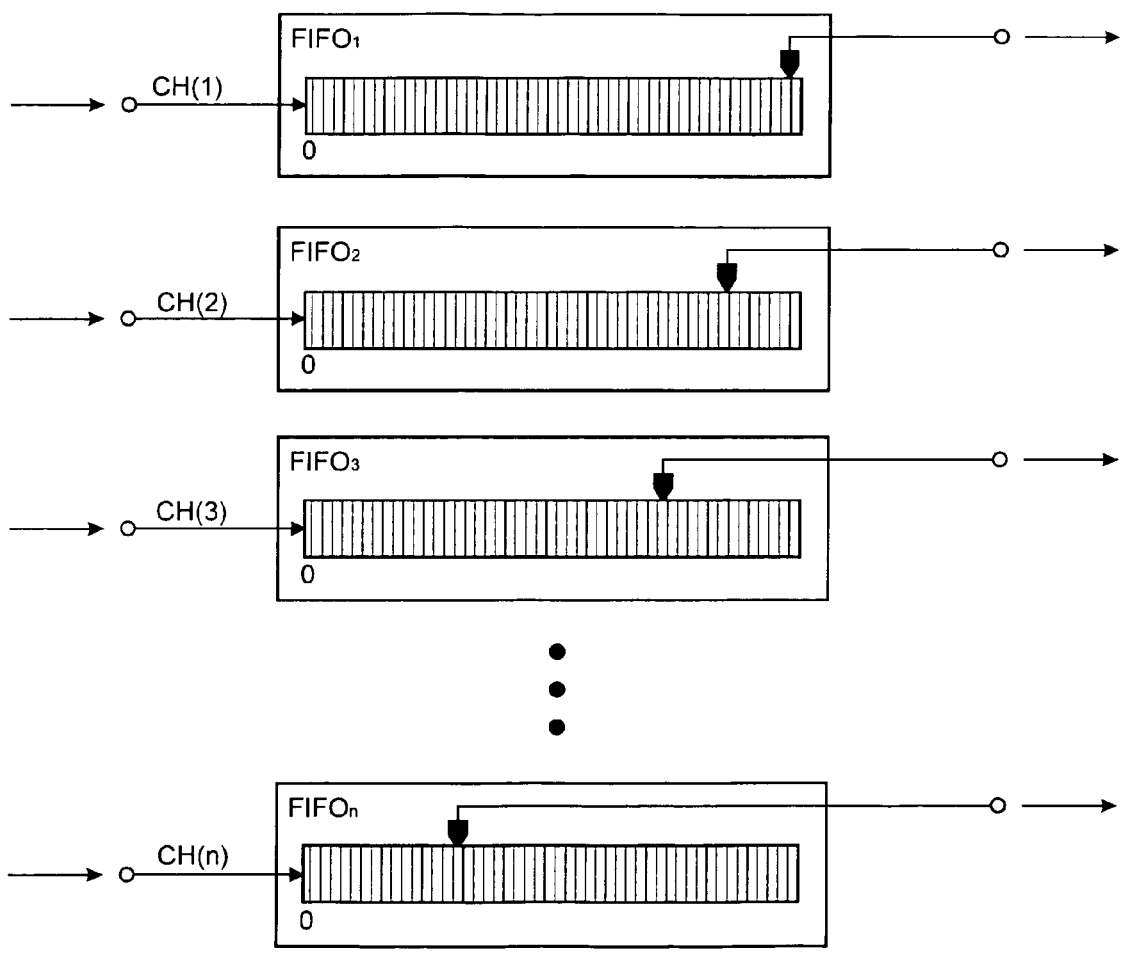
FIGS. 6a and 6b schematically illustrate buffer memory utilization and read pointer positions for aligning data streams in accordance with respective methods of operation of the signal processor illustrated in FIG. 4.
Figure 6B:
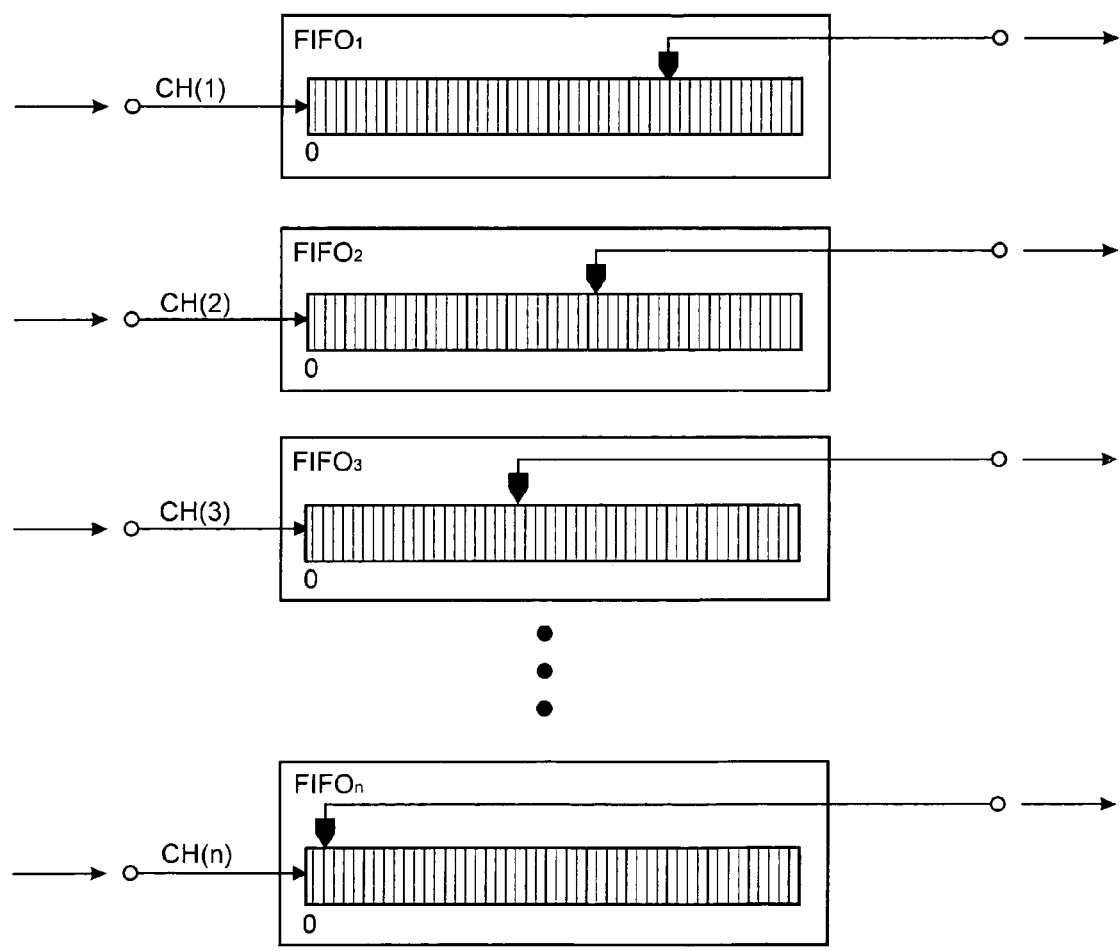

FIGS. 6*a* and 6*b* illustrate two examples of channel processing. In the example illustrated in FIG. 6*a*, a hyper-concatenation composed of n hyper-concatenated data streams distributed over n hyper-concatenated channels are to be processed by respective channel processors 46 within the signal processor 32. In this example, the first arriving signal is assumed to be on channel 1, and the arrival order of the other data streams follows the channel order, for the sake of illustration, so that the last arriving signal is received on channel n. The data stream on channel 1 is designated as the master. The remaining channels (CH(2)–CH(n)) are designated as slave channels, and so synchronize their respective data streams based on a master strobe signal propagated from channel 1. In general, the delay period between arrival of the first bits of the fastest data stream on channel 1, and arrival of the corresponding last arriving bits of the (slowest) data stream on channel n is unknown. Accordingly, the base address used for the read pointer 58 in the master channel processor is set at a point in the buffer to compensate for the expected delay for the slowest data stream, plus some reasonable margin of safety, which may be at or near the highest address of the master buffer 50. Thus, in the master channel processor, the read pointer is positioned near the high address end of the FIFO, so that bits of the master data stream on channel 1 will transit nearly the entire length of the respective FIFO before being read to the outgoing data stream. By default, the base position of the read pointers 58 in each of the slave channel processors is initialized to the same location as in the master channel processor. When the master channel processor locks on the first bytes (A1,A2) of an arriving frame, it generates the master strobe which is propagated across the hyper-concatenation to each of the slave channel processors. Each slave channel processor accumulates a count of a respective clock signal between its local strobe and receipt of the master strobe signal. The count is then used to offset the read pointer from the base position. The read pointers in each of the slave channel processors on channels 2 through channel n are respectively adjusted to various positions progressively closer to the input address for the incoming data stream. Thus, the respective data streams running in channels 2 through channel n transit through progressively smaller portions of their respective FIFOs before being read to the outgoing data stream and exiting the channel processor. Those data streams therefore incur correspondingly shorter delay times within the buffers 50, which effectively advances their timing with respect to the master data stream, to thereby synchronize the data streams across all of the associated channels.

While the example illustrated in FIG. 6a is effective for use in synchronizing the data streams across an arbitrary number of hyper-concatenated channels, designation of the fastest propagating data stream as the master, in combination with the generally unknown delay of the slowest propagating data stream, means that the master data stream may transit almost the entire length of its buffer, and thereby incur a maximum transmission delay. Each of the slower data streams experience lesser transmission delays, but unless the misalignment between the first arriving bits on channel 1 and corresponding bits on the slowest channel is equal to the length of the buffer, then the transmission delays incurred by each data stream is longer than it needs to be.

Clearly, it is desirable to minimize the delay incurred by each of the data streams. FIG. 6b illustrates an example in which the number and distribution of data streams is identical to that of the example shown in FIG. 6a. Thus the data stream having the highest propagation speed arrives on channel 1 with the data streams arriving on channels 2 through n having progressively slower propagation speeds. However, in this case the data stream on the slowest channel is designated as the master, and each of the other channels are designated as slaves. Because the master data stream is the last arriving signal, it is not necessary to buffer the master data stream for any longer than is required to permit generation of the master strobe signal for use by the slave channel processors on the other channels. Thus the read pointer in the master channel processor can be located at a base address that is at or very near the input address (zero), so that little if any of the buffer within the master channel processor is utilized. In each of the slave channel processors, the respective read pointers are initialized to a base address near the input address of the buffer by default, and are adjusted to positions progressively further away from the input address in accordance with the time delay between arrival of bits on the respective slave channel and detection of the master strobe indicating the arrival of corresponding bits on the master channel. As can be seen in FIG. 6b, this results in each data stream incurring a minimal delay while synchronization of the hyper-concatenated data streams across all of the hyper-concatenated channels is achieved.

Although the invention has been explained with reference to optical networks and fiber links, it will be understood by those skilled in the art that the principles and components of the invention may also be applied to the transmission of data over two or more wireless data channels using a wireless device, such as a Code Division Multiplex Process (CDMA) wireless transceiver.

The embodiment(s) of the invention described above is (are) intended to be exemplary only. The scope of the invention is therefore intended to be limited solely by the scope of the appended claims.

We claim:

1. A channel processor for aligning a respective first data stream with a second data stream, each data stream being conveyed within a respective parallel channel and having substantially equivalent bit and frame rates, the channel processor being connected to a respective channel for processing the respective first data stream, and comprising:
   a) a framer for detecting incoming frames of the first data stream, and generate a local strobe signal indicative of a timing of the incoming frames;
   b) a memory for buffering the first data stream;
   c) an interface adapted to receive a master strobe signal from a selected adjacent channel processor;
   d) a switch circuit for selecting one of the local and master strobe signals; and
   e) an output timer for controlling a position of a read pointer for reading the buffered first data stream based on the selected one of the local and master strobe signals.

2. A channel processor as claimed in claim 1, wherein the first and second data streams comprise an arbitrary mix of concatenated and non-concatenated Synchronous Optical Network (SONET) signals.

3. A channel processor as claimed in claim 1, wherein the parallel channels comprise any one or more of:
   a) a wavelength of a Wave Division Multiplexed (WDM) or a Dense Wave Division Multiplexed (DWDM) optical communications system; and
   b) a communications channel of a wireless communications system.

4. A channel processor as claimed in claim 1, wherein the framer comprises:
   a) a detector circuit for generating a detection signal indicative of detection of a selected byte of each incoming frame of the respective first data stream; and
   b) a strobe circuit adapted to generate the local strobe signal with a predetermined timing relative to the detection signal.

5. A channel processor as claimed in claim 4, wherein the detector circuit is for detecting one or more of A1 and A2 bytes of incoming SONET frames, and to generate the detection signal with a predetermined timing relative to reception of the A1 byte.

6. A channel processor as claimed in claim 1, wherein the memory is a First-In-First-Out (FIFO) buffer having a read pointer indicative of an address of an outgoing bit of the respective first data stream.

7. A channel processor as claimed in claim 6, wherein a storage capacity of the memory is selected on a basis of a maximum anticipated misalignment between the first and second data streams.

8. A channel processor as claimed in claim 7, wherein the storage capacity of the memory is equivalent to at most about one-half of a data frame.

9. A channel processor as claimed in claim 7, wherein the storage capacity of the memory is equivalent to a number of bits received during a time interval of at most about 250 nano-seconds (nSec).

10. A channel processor as claimed in claim 6, wherein the output timer comprises:
 a) a phase error detector for detecting a phase error between the local strobe signal and the master strobe signal; and
 b) a pointer adjustment circuit for adjusting the read pointer based on the detected phase error.

11. A channel processor as claimed in claim 10, wherein the phase error detector comprises a counter adapted to count a number of clock pulses between the local strobe signal and the master strobe signal.

12. A channel processor as claimed in claim 10, further comprising an offset circuit adapted to apply a predetermined offset to the read pointer.

13. A channel processor as claimed in claim 12, wherein the predetermined offset is selected to compensate for a propagation delay of the master strobe signal.

14. A channel processor as claimed in claim 10, wherein the switch circuit is for supplying the selected one of the local strobe signal and the master strobe signal to an input of the phase error detector, such that the phase error detector can be selectively controlled to detect one of: a phase error between the local strobe signal and the master strobe signal; and a phase error between the local strobe signal at first and second inputs.

15. A channel processor as claimed in claim 6, wherein the output timer comprises a program-controlled circuit adapted to measure a phase error between the local strobe signal and the master strobe signal, and adjust the read pointer based on the measured phase error.

16. A channel processor as claimed in claim 1, wherein the interface comprises first and second input circuits for receiving a master strobe signal from a respective one of first and second adjacent channel processors.

17. A channel processor as claimed in claim 16, further comprising a direction selector circuit for coupling a selected one of the first and second input circuit to the output timer, such that a master strobe signal propagated from a direction of the selected adjacent channel processor can be used by the output timer.

18. A channel processor as claimed in claim 16, wherein the interface further comprises first and second output circuits adapted to send a selected one of the local strobe signal and the master strobe signal to a respective one of the first and second adjacent channel processors.

19. A system for processing a plurality of data streams, each data stream being conveyed within a respective parallel channel of a communications network, the system comprising a plurality of parallel channel processors, each channel processor comprising:
 a) a framer for generating a local strobe signal indicative of a timing of incoming frames of a respective data stream;
 b) a memory for buffering incoming bits of a respective data stream;
 c) an interface for receiving a master strobe signal from a selected adjacent channel processor;
 d) a switch circuit for selecting one of the local and master strobe signals; and
 e) an output timer for controlling a position of a read pointer for reading the buffered bits of the respective data stream based on the selected one of the local and master strobe signals.

20. A system as claimed in claim 19, further comprising a control unit for:
 a) designating a master channel processor to operate in a free-running mode in which the timing of outgoing bits of a respective master data stream is based on the respective local strobe signal; and
 b) designating a slave channel processor to operate in a slave mode in which the timing of outgoing bits of a respective slave data stream is synchronized to that of the master data stream based on a master strobe signal originating from the master channel processor.

21. A system as claimed in claim 20, wherein the control unit is further for controlling a set of two or more adjacent slave channel processors to successively propagate a strobe signal originating from the master channel processor to each one of the set of adjacent slave channel processors, whereby the timing of outgoing bits of each respective slave data stream is synchronized with that of the master data stream.

22. A system as claimed in claim 20, wherein each of the master and slave data streams comprise concatenated Synchronous Optical Network (SONET) signals.

23. A system as claimed in claim 19, wherein each channel processor is further for selectively propagating a strobe signal received from one adjacent channel processor to an opposite adjacent channel processor.

24. A system as claimed in claim 19, wherein the parallel channels comprise any one or more of:
 a) a wavelength of a Wave Division Multiplex (WDM) or a Dense Wave Division Multiplex (DWDM) optical communications system; and
 b) a communications channel of a wireless communications system.

25. A system as claimed in claim 19, wherein the framer comprises:
 a) a detector circuit for generating a detection signal indicative of detection of a first byte of each incoming frame of the respective data stream; and
 b) a strobe circuit for generating the local strobe signal with a predetermined timing relative to the detection signal.

26. A system as claimed in claim 25, wherein the detector circuit is for detecting one or more of A1 and A2 bytes of incoming SONET frames, and to generate the detection signal at a timing of reception of the A1 byte.

27. A system as claimed in claim 19, wherein the memory is a First-In-First-Out (FIFO) buffer having a read pointer indicative of an address of a successive outgoing bit of the respective data stream.

28. A system as claimed in claim 27, wherein a storage capacity of the memory is selected on a basis of a maximum anticipated misalignment between data streams received by the signal processor.

29. A system as claimed in claim 28, wherein the storage capacity of the memory is equivalent to at most about one-half of a data frame.

30. A system as claimed in claim 28, wherein the storage capacity of the memory is equivalent to a number of bits received during a time interval of at most about 250 nanoseconds (nSec).

31. A system as claimed in claim 27, wherein the output timer comprises:
   a) a phase error detector for detecting a phase error between the local strobe signal and the received strobe signal; and
   b) a pointer adjustment circuit for applying a first offset to the read pointer based on the detected phase error.

32. A system as claimed in claim 31, wherein the phase error detector comprises a counter for counting a number of clock pulses between the local strobe signal and reception of the master strobe signal.

33. A system as claimed in claim 31, wherein the output timer further comprises an offset circuit adapted to apply a predetermined offset to the read pointer.

34. A system as claimed in claim 33, wherein the predetermined offset is selected to compensate a propagation delay of the master strobe signal.

35. A system as claimed in claim 31, wherein the switch circuit is for supplying the selected one of the local strobe signal and the master strobe signal to an input of the phase error detector, such that the phase error detector can be selectively controlled to detect either: a phase error between the local strobe signal and the received strobe signal; or a phase error between the local strobe signal and itself.

36. A system as claimed in claim 19, wherein the interface comprises first and second input circuits for receiving a master strobe signal from a respective one of the first and second adjacent channel processors.

37. A system as claimed in claim 36, further comprising a direction selector circuit for coupling a selected one of the first and second input circuit to the output timer, such that a master strobe signal propagated from a direction of the selected adjacent channel processor can be used by the output timer.

38. A system as claimed in claim 36, wherein the interface further comprises first and second output circuits for sending a selected one of the local strobe signal and the master strobe signal to a respective one of the first and second adjacent channel processors.

39. A method of processing two or more data streams being conveyed within respective adjacent parallel channels of a communications network, the method comprising steps of:
   a) designating a one of the data streams as a master data stream;
   b) designating all others of the data streams as slaves to the master;
   c) at a channel processor for the master data stream, generating a master strobe signal;
   d) propagating the master strobe signal to respective channel processors of each one of the slave data streams; and
   e) at the respective channel processor for each slave data stream: selecting one of a local strobe signal and the master strobe signal; and adjusting a respective read pointer for reading the buffered bits of the respective data stream, using the selected one of the local strobe signal and the master strobe signal.

40. A method as claimed in claim 39, wherein the step of propagating the master strobe signal comprises a step of passing the master strobe signal from the master channel processor to an adjacent slave channel processor.

41. A method as claimed in claim 40, wherein the step of propagating the master strobe signal further comprises a step of passing the master strobe signal to each successive adjacent slave channel processor in a direction away from the master channel processor.

42. A method as claimed in claim 39, wherein each of the data streams comprise concatenated Synchronous Optical Network (SONET) signals.

43. A method as claimed in claim 39, wherein the step of generating the master strobe signal comprises the steps of:
   a) generating a detection signal indicative of detection of a first bit of each incoming frame of the respective master data stream; and
   b) generating the master strobe signal with a predetermined timing relative to the detection signal.

44. A method as claimed in claim 43, wherein the step of generating a detection signal comprises the steps of detecting one or more of A1 and A2 bytes of incoming frames; and generating the detection signal with a predetermined timing relative to a first bit of the A1 byte.

45. A method as claimed in claim 39, wherein the step of adjusting a read pointer for outgoing bits of the respective slave data stream comprises the steps of:
   a) detecting a phase error between a local strobe signal and the master strobe signal; and
   b) adjusting the read pointer based on the detected phase error.

46. A method as claimed in claim 45, wherein the local strobe signal is generated by:
   a) generating a detection signal indicative of detection of a first bit of each incoming frame of the respective slave data stream; and
   b) generating the local strobe signal at a predetermined timing relative to the detection signal.

47. A method as claimed in claim 46, wherein the step of generating a detection signal comprises the steps of detecting one or more of A1 and A2 bytes of incoming frames of the slave data stream; and generating the detection signal with a predetermined timing relative to a first bit of the A1 byte.

48. A method as claimed in claim 45, wherein the step of detecting a phase error comprises a step of counting a number of clock pulses between the local strobe signal and reception of the master strobe signal.

49. A method as claimed in claim 45, wherein the step of adjusting the read pointer for outgoing bits of the respective slave data stream further comprises a step of applying a predetermined offset to the read pointer.

50. A method as claimed in claim 49, wherein the predetermined offset is selected to compensate a propagation delay of the master strobe signal.

51. A method as claimed in claim 45, wherein the step of adjusting the read pointer of outgoing bits of the respective slave data stream further comprises a step of supplying the selected one of the local strobe signal and the master strobe signal to an input of a phase error detector, such that the step of detecting a phase error is selectively controlled to comprise a step of either one of: detecting a phase error between the local strobe signal and the master strobe signal; and detecting a phase error between the local strobe signal and itself.

* * * * *